United States Patent Office

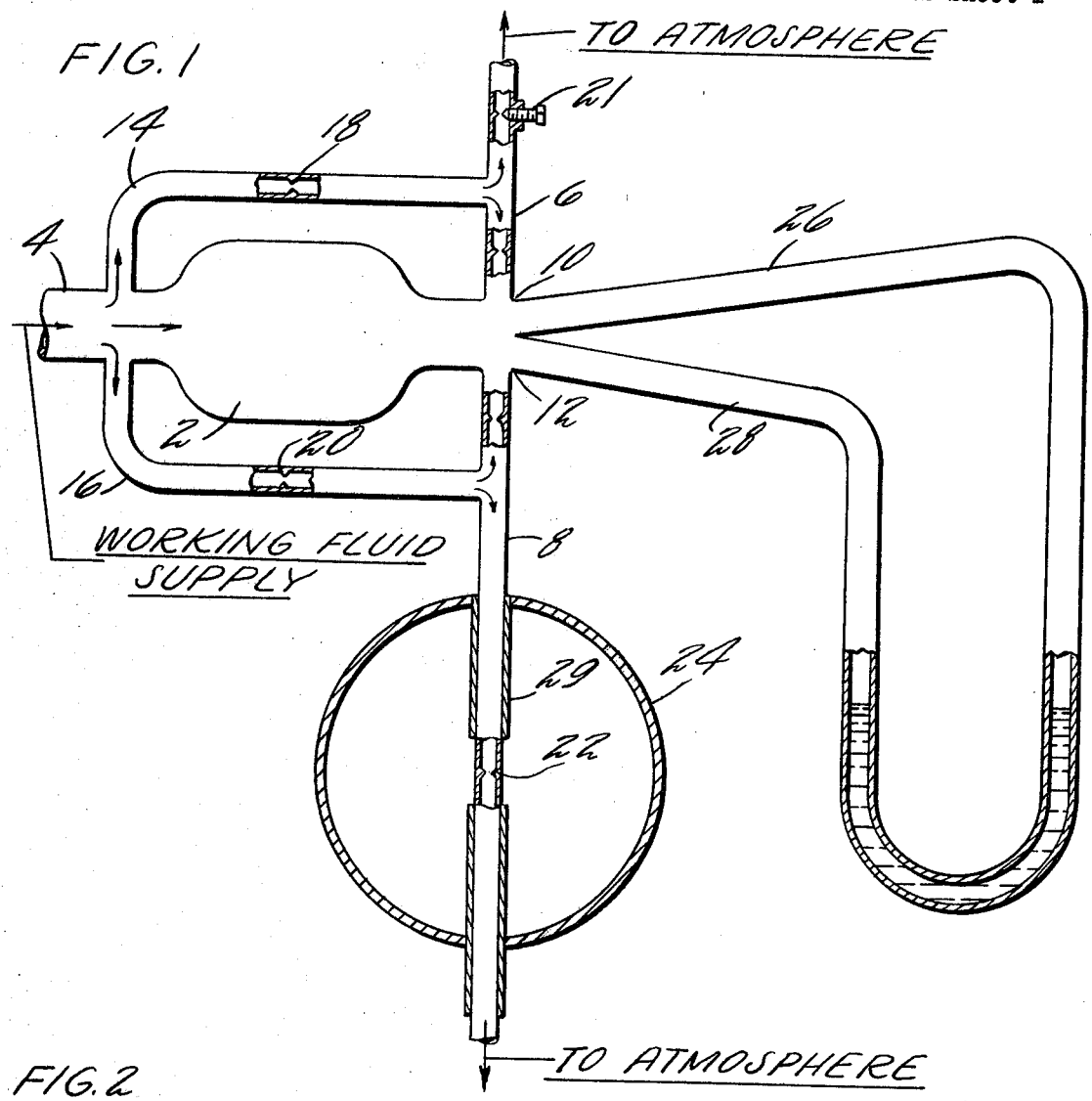
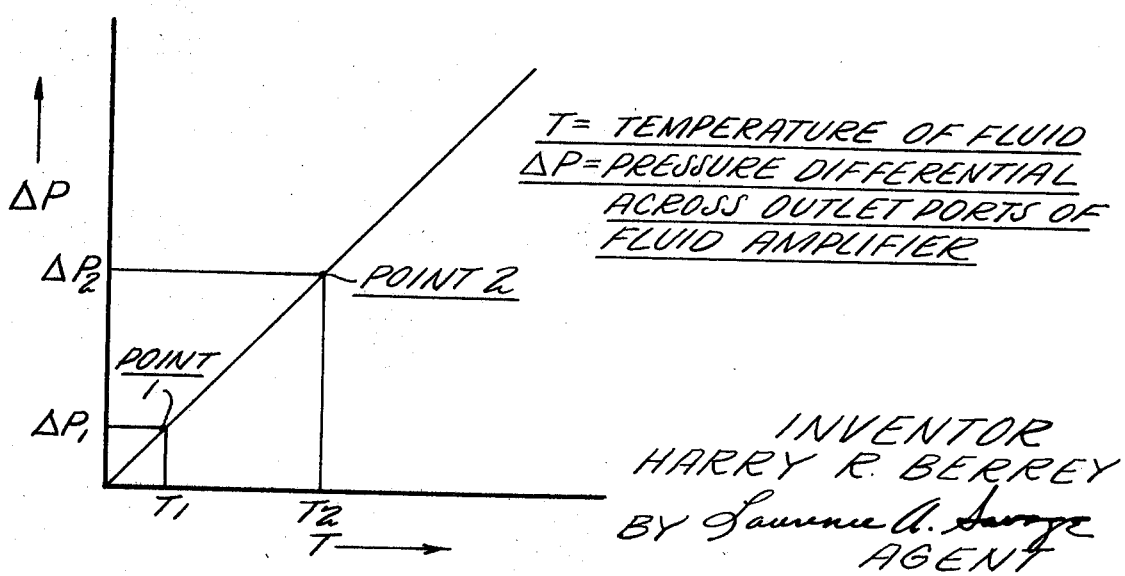

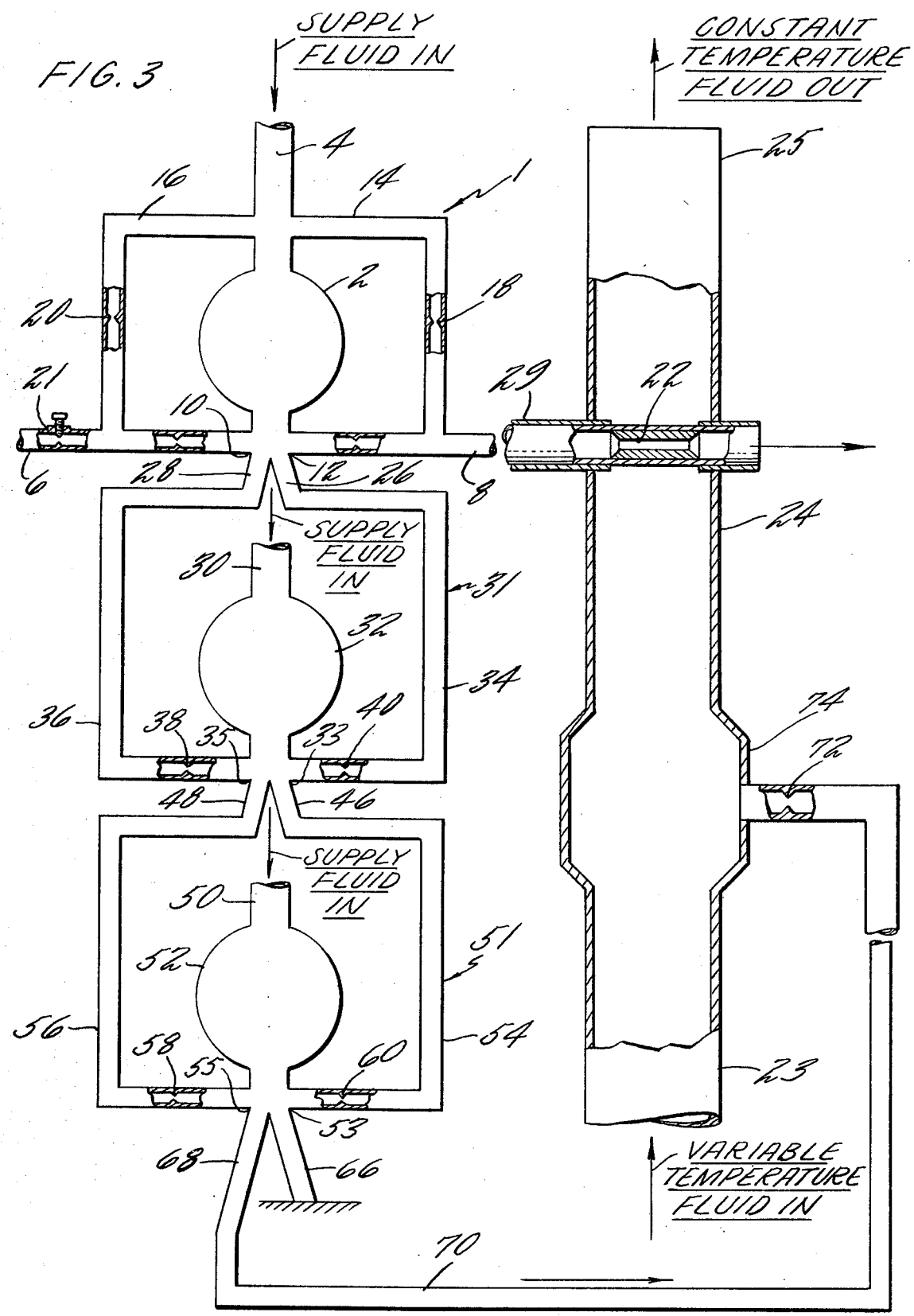

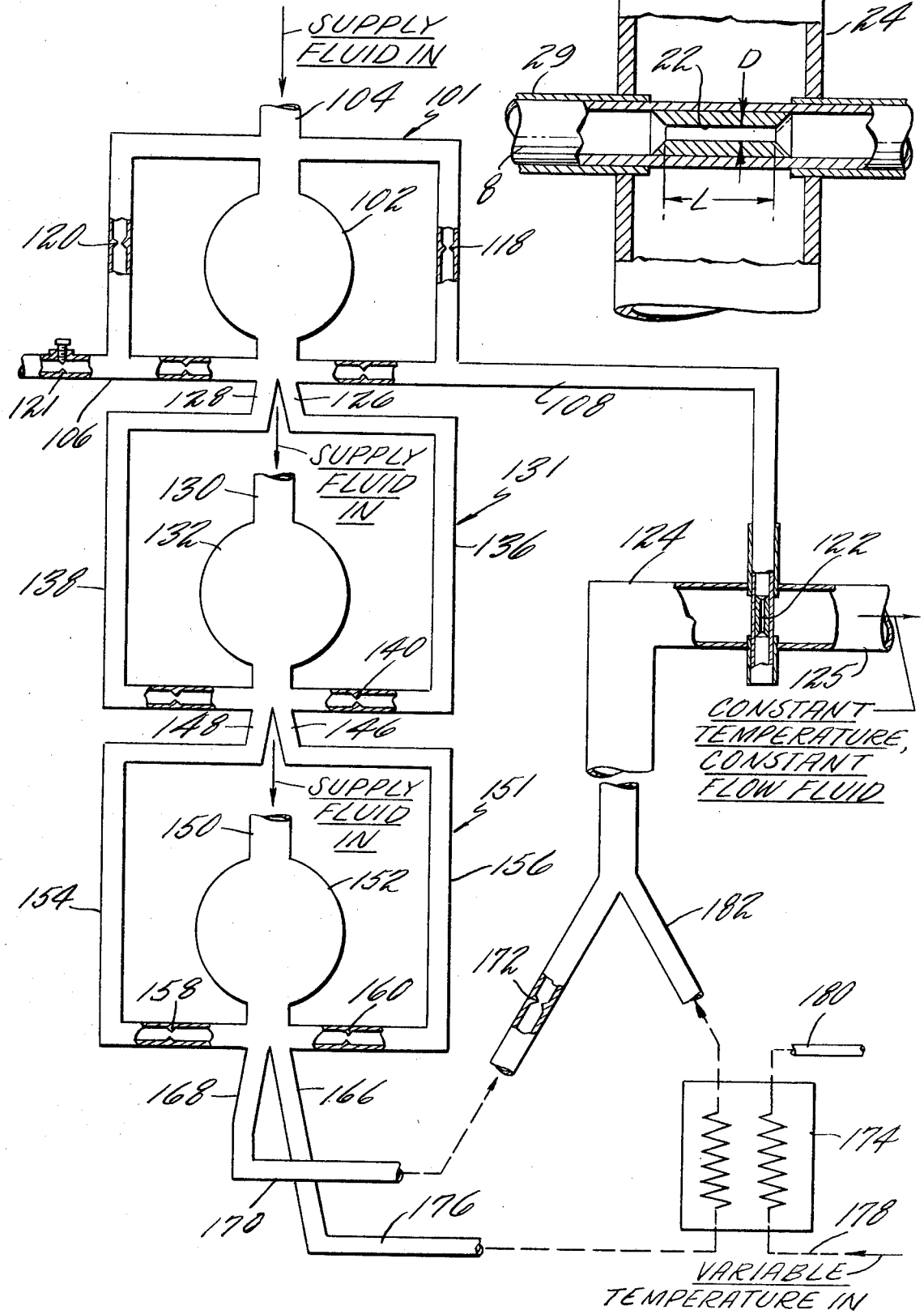
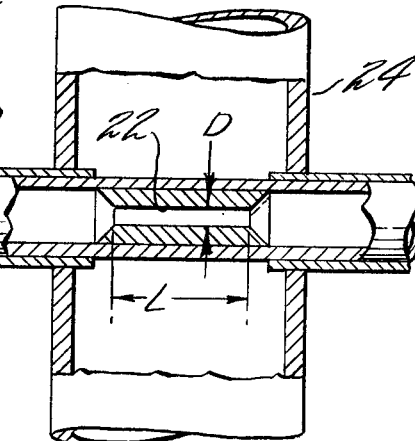

3,513,706
Patented May 26, 1970

3,513,706
TEMPERATURE SENSOR
Harry R. Berrey, Windsor Locks, Conn., assignor to United Aircraft Corporation, East Hartford, Conn., a corporation of Delaware
Filed Oct. 25, 1967, Ser. No. 677,960
Int. Cl. G01k 5/56, 13/02
U.S. Cl. 73—363                                    1 Claim

ABSTRACT OF THE DISCLOSURE

An orifice, the dimensions of which vary with temperature, is disposed in a conduit in parallel with the control port of a proportional fluid amplifier. The conduit is exposed to a fluid, the temperature of which it is desired to measure. As the temperature of the fluid changes, the area of the orifice changes due to thermal expansion or contraction, and the pressure at the control port of the amplifier is varied accordingly, thereby modulating the pressure differential across the outlet ports of the amplifier.

BACKGROUND OF THE INVENTION

Field of the invention

This invention relates to temperature sensors and particularly to fluid temperature sensors, the output signal from which may be utilized for controlling the temperature of the fluid.

Description of the prior art

The usual method of measuring the temperature of a fluid utilizes a thermocouple which may be connected to a potentiometer of other electronic measuring device. Thermocouples have the disadvantages of failure at high temperature and slow response time. Furthermore, in utilizing the temperature signal from a thermocouple to modulate valves to control the temperature of the fluid, other power sources are required to sense, compute, and control; e.g., the signal from the thermocouple must be amplified and transmitted to a solenoid which operates mechanical valves to control the flows of the fluids at various temperatures in order to obtain a flow of fluid at some desired temperature. It is desirable to eliminate the need for electronic components and mechanically moving parts and to have a temperature control system in which all portions of the systems are operated by a common power supply, and which eliminates the interfaces ordinarily encountered in a system utilizing several power sources.

SUMMARY OF THE INVENTION

One object of the present invention is to provide a temperature sensor for measuring the temperature of a fluid which generates a differential pressure signal which is a linear function of temperature.

Another object of the invention is to provide a temperature sensor, the output signal from which may be used to control the temperature of a fluid without the necessity of using electronic components or mechanically moving parts.

Another object of the invention is to provide a temperature sensor in which the working fluid and the fluid, the temperature of which is to be measured, may be completely separated, thus eliminating the possibility of contamination of one fluid by the other.

In accordance with the present invention a temperature sensor which generates a differential pressure signal which is a linear function of temperature, and which uses no electronic components or mechanically moving parts is provided by the combination of a proportional fluid amplifier and variable orifice means in parallel with one of the control ports of the proportional fluid amplifier. The variable orifice means is adapted to change dimensions in response to a change in temperature and is placed in a conduit disposed within the fluid, the temperature of which it is desired to measure; as the temperature of the fluid changes, the dimensions of the variable orifice means change, creating a pressure differential across the control ports of the proportional fluid amplifier, which results in a pressure differential across the output ports of the amplifier. This pressure differential has been found to be a linear function of the temperature of the fluid being measured.

In accordance with a further aspect of the invention the pressure differential existing across the output ports of the proportional fluid amplifier, which is ideally suited for utilization as a signal for pure fluid temperature control systems, and may also be advantageously utilized in conventional temperature control systems as will be explained in more detail hereinafter, is utilized as a signal for controlling the temperature of the fluid.

The foregoing and other objects, features and advantages of the present invention will become more apparent in the light of the following detailed description of a preferred embodiment thereof, as illustrated in the accompanying drawings.

DESCRIPTION OF THE DRAWINGS

FIG. 1 is a schematic illustration of an exemplary embodiment of a temperature sensor in accordance with the present invention.

FIG. 2 is a graphic illustration of the linear relationship between the temperature of the fluid being measured and the pressure differential across the outlet ports of the proportional fluid amplifier.

FIG. 3 is a schematic illustration of a temperature control system utilizing a temperature sensor according to the present invention as a signal generator for controlling the temperature of a fluid.

FIG. 4 is an enlarged view of an exemplary variable orifice means shown in FIG. 3, the dimensions of which vary in response to temperature change.

FIG. 5 is a schematic illustration of another temperature control system utilizing a temperature sensor according to the present invention as a signal generator for controlling the temperature of a fluid.

DESCRIPTION OF THE PREFERRED EMBODIMENT

Referring now to FIG. 1, there is shown a proportional fluid amplifier having an inlet 2 connected to a conduit 4 through which it is supplied with working fluid. Conduits 6 and 8 are connected to control ports 10 and 12, respectively, of the fluid amplifier. Conduits 14 and 16 connect conduit 4 with conduits 6 and 8, respectively. Conduits 14 and 16 have disposed therein fixed orifices 18 and 20, respectively, and conduit 6 has an adjustable orifice 21 disposed therein. Conduit 8 has orifice 22 disposed therein, and a portion of conduit 8 containing orifice 22 is disposed within the fluid, the temperature of which it is desired to measure. Orifice 22 is adapted to change dimensions in response to a change in its temperature. For purposes of explanation the measurable fluid is shown contained in duct 24. The ends of conduits 6 and 8, opposite the control ports 10 and 12 of the fluid amplifier 1, are exposed to a pressure which is lower than the working fluid supply pressure; generally, this is accomplished by venting to atmosphere. The fluid amplifier is also supplied with two outlet ports 26 and 28; the outlet ports are shown connected to a simple U-tube manometer for measuring the pressure differential across the outlet ports 26 and 28. The portion of conduit 8 which is enclosed within duct 24 is shown as being insulated with any suitable insulation material 29 to minimize the heating of the working fluid, thus reducing extraneous effects on the measurement.

The operation of the temperature sensor is as follows: at some known fluid temperature within duct 24, the orifice 21 is adjusted to cause the pressure in outlet port 26 to equal the pressure in outlet port 28 resulting in a pressure differential across the outlet ports 26 and 28 or zero. If the temperature of the fluid flowing through duct 24 is increased, the cross-sectional area of orifice 22, which, by way of example, may be sharp-edged orifice, increases due to thermal expansion of the orifice, thus reducing the pressure at the control port 12 of the proportional fluid amplifier 1. Reduction of the pressure at the control port 12 causes a pressure differential across outlet ports 26 and 28 proportional to the pressure differential across the control ports 10 and 12 which is a linear function of the temperature of the fluid in duct 24. In this case the pressure at outlet port 28 will be greater than the pressure at outlet port 26. On the other hand, if the temperature in duct 24 is decreased, the cross-sectional area of orifice 22 will decrease due to the thermal contraction of orifice 22, and, therefore the pressure at the control port 12 of the proportional fluid amplifier 1 will increase; when this happens, the working fluid flowing through the proportional fluid amplifier will be deflected proportionately toward outlet port 26 and, therefore, the pressure in outlet port 26 will be greater than the pressure in outlet port 28 and a pressure differential across the two will result.

The resulting pressure differential may be converted to an indication of the temperature in any of several ways well known in the art. One such method, for example, is to measure the pressure differential across outlet ports 26 and 28 at any two known fluid temperatures. These conditions may be plotted as point 1 and point 2 as shown in FIG. 3. Since the relation between the temperature of the fluid and the pressure differential across the outlet ports of the proportional fluid amplifier has been found to be a straight-line function, point 1 and point 2 may be connected by a straight line; for any given pressure differential existent across the outlet ports of the fluid amplifier, a corresponding temperature of fluid may be obtained from the graph.

FIG. 3 shows the temperature sensor according to the present invention incorporated into a pure fluid temperature control system. The object of the temperature control system is to maintain the temperature of the fluid in duct 24 constant. By way of example variable temperature air at some temperature $T_1$ is shown entering duct 24 at inlet 23, and leaving at a constant temperature $T_3$ at the outlet 25 of duct 24. The operation of the proportional fluid amplifier 1 is exactly as described above and will not be described herein. The orifice 22, the area of which varies in response to variations in the temperature of the fluid in duct 24 may be, for example, a lamina resistor having length L and diameter $d$, which is placed within a conduit 8 disposed within duct 24. As the temperature changes, the dimensions of the lamina resistor change due to thermal expansion (or contraction) of the resistor material. As the dimensions change, the resistance changes, resulting in a change in the pressure applied to the inlet port 12 of the proportional fluid amplifier 1. Flow through such a lamina resistor is a function of the length and diameter of the orifice and the pressure drop thereacross as defined by the equation $$Q = f \frac{(d^4 \Delta P)}{L}$$

where $d$ is the diameter of the orifice, L is the length of the orifice, $\Delta P$ is the pressure drop across the orifice and Q is the flow through the orifice. FIG. 4 shows a lamina resistor which is suitable as an orifice which changes dimension in response to changes of temperature of fluid being measured.

Fluid at temperature $T_2$ is supplied to the inlet of proportional fluid amplifier 1 and to the inlet 32 of proportional fluid amplifier 31 and the inlet 52 of proportional fluid amplifier 51 through supply conduits 4, 30, and 50, respectively. Proportional fluid amplifiers 31 and 51 are included as flow amplifiers only and form no part of the inventive concept of the present invention. Outlet ports 26 and 28 of proportional fluid amplifier 1 are connected in series to control ports 33 and 35, respectively, by conduits 34 and 36, respectively. Likewise, outlet ports 46 and 48 of fluid amplifier 31 are connected to control ports 53 and 55, respectively, by conduits 54 and 56, respectively. Outlet port 66 of fluid amplifier 51 is grounded, and outlet port 68 of fluid amplifier 51 may be connected to a heat exchanger or a mixing chamber 74 in duct 24 by conduit 70.

The operation of the fluid temperature control system shown in FIG. 3 is as follows: Assume a flow of fluid entering the inlet 23 of duct 24 at some temperature $T_1$ which tends to exceed the desired fluid temperature $T_3$ leaving duct 24 through outlet 25. Fluid at some temperature $T_2$ which is less than the desired temperature $T_3$ is admitted to proportional fluid amplifiers 1, 31, and 51 as described above. With fluid flowing through duct 24 at the desired temperature $T_3$, variable orifice 21 is adjusted so that the pressure differential across the outlet ports 26 and 28 of proportional fluid amplifier 1 is equal to zero. If the temperature of the fluid flowing through duct 24 increases, the length L of orifice 22 will increase by thermal expansion; as the length L increases, the flow through the orifice 22 decreases thereby increasing the pressure in conduit 8 and at the control port 12 of fluid amplifier 1. Since the pressure at the control port 12 is now greater than the pressure at control port 10, the flow through fluid amplifier 1 is directed, in a proportionately greater amount towards outlet port 28. The flow of outlet port 28, being greater than the flow through outlet port 26 will deflect the flow through proportional fluid amplifier 31, in a proportionately greater amount to outlet 46 of amplifier 31. Likewise, the flow through outlet 46, being greater than the flow through outlet 48 will direct a proportionately greater amount through conduit 70 and into the mixing chamber 74 in duct 24. As the flow of fluid at temperature $T_2$ and the flow of fluid at temperature $T_1$ mix the create a fluid approaching the desired temperature $T_3$, the orifice 22 will decrease in length by thermal contraction. This decrease in length will reverse the process described immediately above and return the pressure differential across the outlets 26 and 28 of fluid amplifier 1 to zero. The cooling fluid at temperature $T_2$ entering fluid amplifier 51 at inlet 52 will be seen to be directed to outlet 66 which is grounded, thereby preventing the fluid from entering mixing chamber 74 and cooling the temperature of the fluid passing therethrough below the desired temperature $T_3$.

In FIG. 5 there is shown another embodiment of a temperature control system utilizing a temperature sensor according to the present invention. It is similar in operation to the control system shown in FIG. 3 except that instead of grounding control port 166, conduit 176 connects control port 166 with duct 124 via heat exchanger 174. Variable temperature fluid enters heat exchanger 174, through conduit 178 at some temperature $T_2$; this fluid leaves heat exchanger 174 through conduit 180 after exchanging heat with fluid at temperature $T_1$ entering heat exchanger 174 via conduit 176. A conduit 172 connects the outlet port 168 with the duct 124 via conduit 170 which may have an orifice 172 disposed therein to equalize the pressure drop in the two flow paths, i.e., between fluid amplifier outlet ports 166 and 168 and duct 124. A constant flow of fluid at constant temperature $T_3$ is provided at the outlet 125 of duct 124.

There has thus been described a preferred embodiment of a temperature sensor in accordance with the present invention and temperature control systems utilizing a temperature sensor in accordance with the present invention. It should be noted that while three proportional fluid amplifiers are shown in the above-described temperature control systems, only one such amplifier is necessary to provide a system in accordance with the novelty of this invention, and that any number of proportional fluid amplifiers may be added in order to amplify the flow to the optimum level. Therefore, it should be understood by those skilled in the art that various changes and omissions in the form and detail thereof may be made therein without departing from the spirit and scope of the invention.

What I claim as new and desire to secure by Letters Patent of the United States is:

1. Apparatus for measuring the temperature of a fluid, comprising:
   a first conduit connected to a first source of fluid under pressure;
   a proportional fluid amplifier having a fluid inlet in communication with said first conduit, first and second outlet ports, and first and second control ports;
   a second conduit connecting said first control port to a second pressure source, said second pressure source having a lower pressure than the pressure of said first source of fluid under pressure, and said second conduit having an adjustable orifice disposed therein;
   a third conduit connecting said second control port to said second pressure source, a portion of said third conduit being disposed in the fluid, the temperature of which it is desired to measure, and portion having disposed therein a sharp-edged orifice, the cross-sectional area of which increases in response to an increase in temperature, and which decreases in response to a decrease in temperature;
   a fourth conduit having an orifice disposed therein, said fourth conduit connecting said first conduit with said second conduit at a point between said adjustable orifice and said first control port;
   a fifth conduit having an orifice disposed therein, said fifth conduit connecting said first conduit with said third conduit at a point between said variable orifice means and said second control port; and
   means for sensing the pressure differential across the first and second outlet ports.

References Cited

UNITED STATES PATENTS

| | | | |
|---|---|---|---|
| 2,703,013 | 3/1955 | Wildhack | 73—357 |
| 3,314,294 | 4/1967 | Colston | 73—357 |

LOUIS R. PRINCE, Primary Examiner

D. E. CORR, Assistant Examiner

U.S. Cl. X.R.

73—357; 137—81.5

UNITED STATES PATENT OFFICE
CERTIFICATE OF CORRECTION

Patent No. 3,513,706        Dated May 26, 1970

Inventor(s)    Harry R. Berrey

It is certified that error appears in the above-identified patent and that said Letters Patent are hereby corrected as shown below:

Claim 1, column 6, line 4   delete "and" and
insert -- said --

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents